May 14, 1935. 2,001,656
R. VON GRÜBER-REHENBÜRG ET AL
PROCESS AND APPARATUS FOR REDUCING SOLVENT LOSSES IN FABRIC CLEANING
Filed Aug. 25, 1934
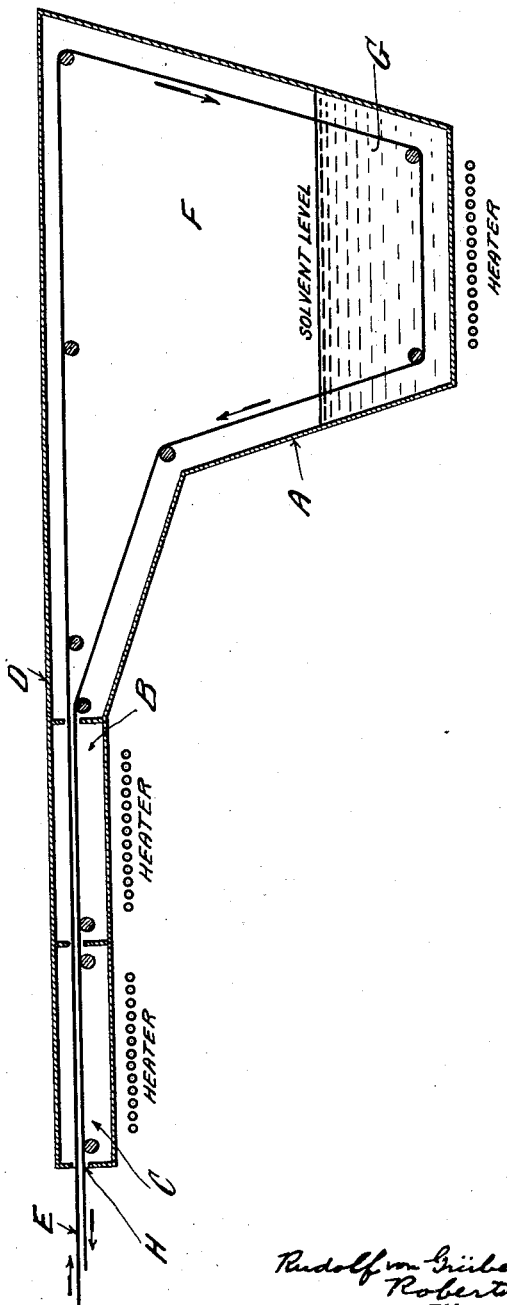

Patented May 14, 1935

2,001,656

UNITED STATES PATENT OFFICE 2,001,656

PROCESS AND APPARATUS FOR REDUCING SOLVENT LOSSES IN FABRIC CLEANING

Rudolf von Grüber-Rehenbürg and Robert Stöbe, Munich, Germany, assignors to Dr. Alexander Wacker Gesellschaft für Elektrochemische Industrie G. m. b. H., Munich, Germany, a corporation Application August 25, 1934, Serial No. 741,526
In Germany August 9, 1933

6 Claims. (Cl. 68—38)

In the continuous treatment of a length of material with volatile solvents it is desirable to prevent the solvent vapors from escaping into the room, and usually the solvent containing vessel is provided with narrow slots to permit entrance of the fabric webbing on one side and exit on the other. The result is that the incoming material draws air along with it, which dilutes the vapors in the vessel, and the outgoing material draws out mixed air and solvent vapor, resulting in material solvent losses which have both an industrial as well as a sanitary disadvantage.

We have found that the solvent losses can be very materially reduced if an opportunity is afforded the incoming and outgoing portions of the material to exchange the air and vapor carried along. This occurs by preferably passing the incoming and outgoing portions of the material closely adjacent each other through one or more exchange chambers, whereby the solvent vapors carried out by the material from the treating vessel are transferred to the incoming material and drawn back into the treating vessel. In this manner, appreciable quantities of solvents are not discharged from the treating apparatus into the room. In running through the exchange chamber or chambers, the incoming and outgoing portions of the material are kept parallel as closely to each other as possible, and hence pass in and out of a slot of minimum width in the end of the exchange chamber, the apparatus otherwise being completely enclosed. Also, one or more of the exchange chambers can be heated to facilitate the exchange of vapors by the dry incoming web from the relatively wet outgoing material.

The invention is illustrated in the accompanying drawing, which is a schematic section through one form of apparatus wherein A is the treatment vessel to be supplied with solvent or with heated solvent vapors and where liquid solvent is used in the vessel, a heater may be conveniently used at the botton. B is the first exchange chamber with a heater, and C a second exchange chamber, the whole having a top cover D. E is the incoming material which runs in in a horizontal direction under the top D over roller into the vapor space F, through the liquid G, and then up over rollers through first exchange chamber B, and second exchange chamber C, and in close proximity to the incoming untreated material. As will be seen from the drawing, the incoming and outgoing material passes through narrow slot H whereby a minimum of solvent is lost into the room.

The invention claimed is:

1. Process for the reduction of solvent losses in the treatment of a length of material with volatile solvents in continuous operation comprising passing the incoming and outgoing portions of the material through an exchange chamber in close proximity to each other before treating the incoming material with the solvent.

2. Process for the reduction of solvent losses in the treatment of a length of material with volatile solvents in continuous operation comprising passing the incoming and outgoing portions of the material through a plurality of exchange chambers in close proximity to each other before treating the incoming material with the solvent.

3. Process for the reduction of solvent losses in the treatment of a length of material with volatile solvents in continuous operation comprising passing the incoming and outgoing portions of the material through an exchange chamber in close proximity to each other before treating the incoming material with the solvent, and heating said material during passage through said chamber.

4. Process for the reduction of solvent losses in the treatment of a length of material with volatile solvents in continuous operation comprising passing the incoming and outgoing portions of the material through an enclosed space in close proximity and parallel to each other before and after treatment with the solvent and heating said portions while in such close proximity to each other to transfer solvent from the outgoing material to the incoming material.

5. Apparatus for treating a length of material with a solvent comprising a closed treatment vessel adapted to contain a solvent, an exchange chamber connected thereto having an opening to the outside for conveying said material to and from said vessel, and means for passing the incoming and outgoing portions of the material through said exchange chamber in close proximity and parallel to each other whereby to transfer solvent from the outgoing material to the incoming material.

6. Apparatus for treating a length of material with a solvent comprising a closed treatment vessel adapted to contain a solvent, an exchange chamber connected thereto having an opening to the outside for conveying said material to and from said vessel, means for passing the incoming and outgoing portions of the material through said exchange chamber in close proximity and parallel to each other, and means for heating the material in said exchange chamber, whereby to transfer solvent from the outgoing material to the incoming material.

RUDOLF v. GRÜBER REHENBÜRG.
ROBERT STÖBE.